United States Patent
Vinayagamurthy et al.

(10) Patent No.: US 11,861,476 B2
(45) Date of Patent: Jan. 2, 2024

(54) SECURE ENSEMBLE TRAINING AND INFERENCE USING HETEROGENEOUS PRIVATE MACHINE LEARNING MODELS

(71) Applicant: International Business Machines Corporation, Armonk, NY (US)

(72) Inventors: Dhinakaran Vinayagamurthy, Erode (IN); Sandeep Nishad, Lucknow (IN); Harsh Chaudhari, Mumbai (IN); Pankaj Satyanarayan Dayama, Bangalore (IN); Saneem Ahmed Chemmengath, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/405,582

(22) Filed: Aug. 18, 2021

(65) Prior Publication Data
US 2023/0058219 A1    Feb. 23, 2023

(51) Int. Cl.
| | |
|---|---|
| *G06F 16/25* | (2019.01) |
| *G06N 20/00* | (2019.01) |
| *G06N 20/20* | (2019.01) |
| *G06F 16/28* | (2019.01) |
| *G06F 16/245* | (2019.01) |

(52) U.S. Cl.
CPC .......... *G06N 20/20* (2019.01); *G06F 16/245* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 10,764,246 B2 | 9/2020 | Huang et al. | |
| 10,803,328 B1* | 10/2020 | Bai | ............... G06V 20/58 |
| 2017/0063896 A1* | 3/2017 | Muddu | ............... G06F 40/134 |
| 2019/0378049 A1 | 12/2019 | Widmann et al. | |
| 2020/0111022 A1 | 4/2020 | Silberman et al. | |
| 2020/0143267 A1 | 5/2020 | Gidney | |

FOREIGN PATENT DOCUMENTS

WO    WO-2020115748 A1 *    6/2020    ......... G06F 16/9014

OTHER PUBLICATIONS

Jurgen Schmidhuber; Deep Learning in neural networks; Elsevier; 2015; pp. 1-33 (Year: 2015).*

* cited by examiner

*Primary Examiner* — Albert M Phillips, III
*Assistant Examiner* — Jermaine A Mincey
(74) *Attorney, Agent, or Firm* — Ference & Associates, LLC

(57) ABSTRACT

One embodiment provides a method, including: receiving a query from a user; providing the query to data owners, wherein each of the data owners has a local machine learning model and wherein the plurality of data owners train a meta-model; secret sharing model output from the data owners between the other data owners, wherein the model output comprises an output responsive to the query computed using the local machine learning model; receiving, from each of the plurality of data owners, a set of meta-features corresponding to the query; and generating a response to the query, wherein the generating comprises determining, by evaluating the meta-model using the set of meta-features received from each of the plurality of data owners, weights for outputs from the local machine learning models and aggregating the outputs in view of the weights.

18 Claims, 4 Drawing Sheets

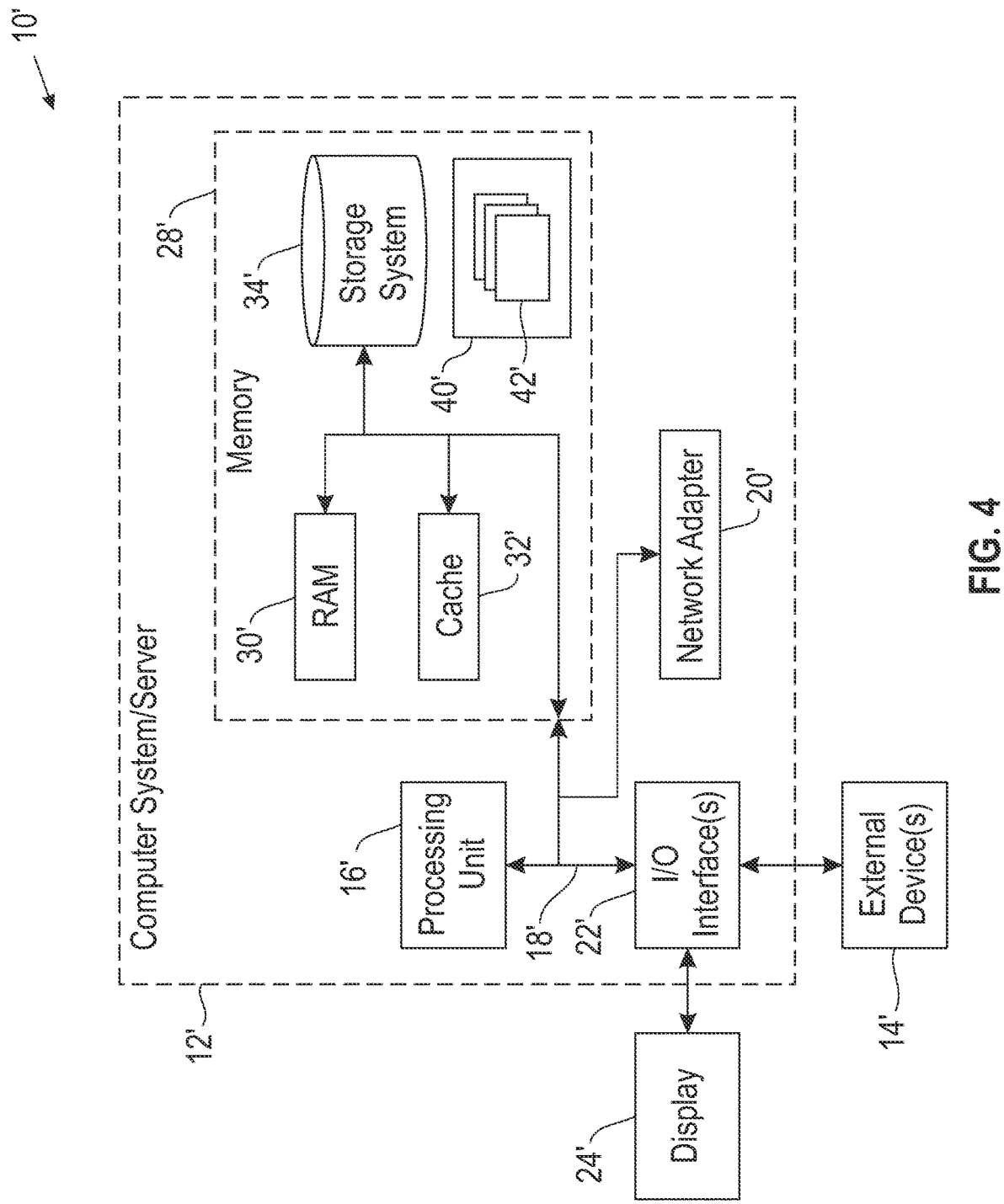

SECURE ENSEMBLE TRAINING AND INFERENCE USING HETEROGENEOUS PRIVATE MACHINE LEARNING MODELS

BACKGROUND

Many data owners have made data accessible to many different users or clients. For example, the data owners may allow other users or clients to access data in order to perform some desired function by the client. Generally, the client can request, for example, by providing a query, access to a particular set of data of the data owner and the data owner then provides data that is responsive to the request or query. However, data owners do not have all data that a client may be wanting, so it is beneficial for data owners to work together and some or all of the cooperating data owners may provide information responsive to the request or query. However, working together requires a bit of orchestration that may be difficult to achieve among the data owners themselves. Accordingly, many data owners may interact with a service provider that interfaces with the clients and all the data owners connected to the service provider. The service provider is the entity that determines which data owners may have information responsive to the query and then provides instructions to the corresponding data owner in order to retrieve that information and provide it back to the client. Such a model reduces the overhead and interaction required for the data owners while allowing clients to obtain more extensive information than would be likely when just interacting with a single data owner.

BRIEF SUMMARY

In summary, one aspect provides a method, including: receiving, at a service provider, a query from a user, wherein the service provider is connected with a plurality of data owners, each of the plurality of data owners having at least one dataset including information responsive to the query; providing, by the service provider, the query to each of the plurality of data owners, wherein each of the plurality of data owners has a local machine learning model trained using a dataset of a corresponding data owner, wherein each data owner provides a commitment of the local machine learning model, and wherein the plurality of data owners train a meta-model by a collaboration facilitated by the service provider using secure multi-party computation, wherein each of the plurality of data owners has a share of the meta-model; secret sharing, via the service provider, model output from each of the plurality of data owners between the other of the plurality of data owners, wherein the model output includes an output responsive to the query computed using the local machine learning model corresponding to the data owner and wherein the sharing includes, each of the plurality of data owners, encrypting, to each other data owner, the model output corresponding to the data owner and encrypting the model output shared from the other of the plurality of data owners; receiving, at the service provider and from each of the plurality of data owners, a set of meta-features corresponding to the query, wherein each of the set of the meta-features are extracted, from the encrypted secret shares of the model outputs, by a corresponding of the plurality of data owners using meta-training samples from the local machine learning model and cluster centroids from other of the plurality of data owners; and generating, using the service provider, a response to the query, wherein the generating includes determining, by evaluating the meta-model using the set of meta-features received from each of the plurality of data owners, weights for outputs from the local machine learning models and aggregating the outputs in view of the weights.

Another aspect provides an apparatus, including: at least one processor; and a computer readable storage medium having computer readable program code embodied therewith and executable by the at least one processor; wherein the computer readable program code is configured to receive, at a service provider, a query from a user, wherein the service provider is connected with a plurality of data owners, each of the plurality of data owners having at least one dataset including information responsive to the query; wherein the computer readable program code is configured to provide, by the service provider, the query to each of the plurality of data owners, wherein each of the plurality of data owners has a local machine learning model trained using a dataset of a corresponding data owner, wherein each data owner provides a commitment of the local machine learning model, and wherein the plurality of data owners train a meta-model by a collaboration facilitated by the service provider using secure multi-party computation, wherein each of the plurality of data owners has a share of the meta-model; wherein the computer readable program code is configured to secret share, via the service provider, model output from each of the plurality of data owners between the other of the plurality of data owners, wherein the model output includes an output responsive to the query computed using the local machine learning model corresponding to the data owner and wherein the sharing includes, each of the plurality of data owners, encrypting, to each other data owner, the model output corresponding to the data owner and encrypting the model output shared from the other of the plurality of data owners; wherein the computer readable program code is configured to receive, at the service provider and from each of the plurality of data owners, a set of meta-features corresponding to the query, wherein each of the set of the meta-features are extracted, from the encrypted secret shares of the model outputs, by a corresponding of the plurality of data owners using meta-training samples from the local machine learning model and cluster centroids from other of the plurality of data owners; and generate, using the service provider, a response to the query, wherein the generating includes determining, by evaluating the meta-model using the set of meta-features received from each of the plurality of data owners, weights for outputs from the local machine learning models and aggregating the outputs in view of the weights.

An additional aspect provides a computer program product, including: a computer readable storage medium having computer readable program code embodied therewith, the computer readable program code executable by a processor; wherein the computer readable program code is configured to receive, at a service provider, a query from a user, wherein the service provider is connected with a plurality of data owners, each of the plurality of data owners having at least one dataset including information responsive to the query; wherein the computer readable program code is configured to provide, by the service provider, the query to each of the plurality of data owners, wherein each of the plurality of data owners has a local machine learning model trained using a dataset of a corresponding data owner, wherein each data owner provides a commitment of the local machine learning model, and wherein the plurality of data owners train a meta-model by a collaboration facilitated by the service provider using secure multi-party computation, wherein each of the plurality of data owners has a share of the meta-model; wherein the computer readable program code is configured to secret share, via the service provider, model output from each of the plurality of data owners between the other of the plurality of data owners, wherein the model output includes an output responsive to the query computed using the local machine learning model corresponding to the data owner and wherein the sharing includes, each of the plurality of data owners, encrypting, to each other data owner, the model output corresponding to the data owner and encrypting the model output shared from the other of the plurality of data owners; wherein the computer readable program code is configured to receive, at the service provider and from each of the plurality of data owners, a set of meta-features corresponding to the query, wherein each of the set of the meta-features are extracted, from the encrypted secret shares of the model outputs, by a corresponding of the plurality of data owners using meta-training samples from the local machine learning model and cluster centroids from other of the plurality of data owners; and generate, using the service provider, a response to the query, wherein the generating includes determining, by evaluating the meta-model using the set of meta-features received from each of the plurality of data owners, weights for outputs from the local machine learning models and aggregating the outputs in view of the weights.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 4 illustrates a computer system.

DETAILED DESCRIPTION

Figure 1:
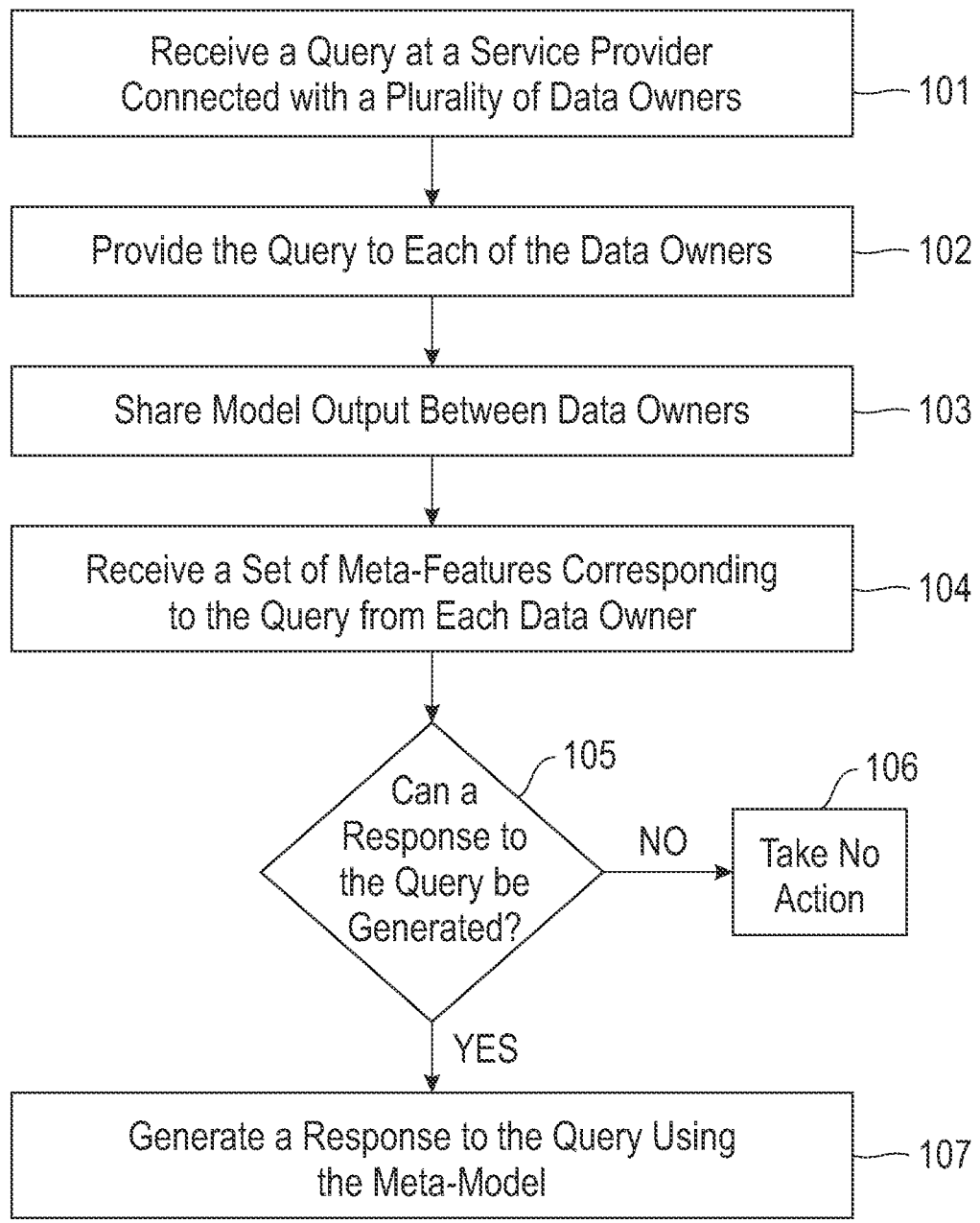
FIG. 1 illustrates a method of using a service provider to provide a response to a query using a plurality of data owners while maintaining privacy among the data owners and between the data owners and the service provider.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

The problem with the service model is that information of the data owner is shared with not only the client, but also the service provider and possibly other data owners. In the current environment where information is treated much like a currency, giving away or exposing information for free is very undesirable for a data owner. In other words, data owners do not trust each other or the service provider, so the data owners want to ensure that the information stays private from other data owners and the service provider. The data owner also wants to ensure that any information that is not responsive to the query provided by the client is kept private from the client. Thus, there have been many attempts to either reduce or eliminate the amount of information of a data owner that is shared with entities other than the client.

A conventional technique for reducing the amount of information that is shared with other entities, is to use a fully-trusted or semi-trusted service provider. In such a system the service provider is trusted with the information gathered from the data owners and is trusted to not misuse the information for purposes other than providing a response to the client query. Similarly, some systems may use multiple service providers that are all at least partially trusted and each service provider receives a portion of the information that is responsive to the query. The service providers then collaborate to provide the final response to the query. In such a technique, none of the service providers are provided enough information to be able to discern the full information set. However, these systems require that the service provider is trusted, which may be difficult for a data owner to accept. Additionally, in conventional systems, the client is not provided with a guarantee that the information provided is accurate or the best information accessible to the service provider.

Accordingly, an embodiment provides a system and method for using a service provider to provide a response to a query using a plurality of data owners while maintaining privacy among the data owners and between the data owners and the service provider. The service provider in the described system receives a query from a user or client. The service provider provides the query to each of the data owners that are connected to the service provider. Each of the data owners has a dataset having information responsive to the query and a local machine learning model that is trained using the dataset of the data owner. The data owners also work together, using secure multi-party computation, to train a meta-model and, after the meta-model is trained, each of the data owners has a share of the meta-model.

Each data owner runs or evaluates the query using the local machine learning model of the data owner to compute an output responsive to the query. From the output, the data owner extracts meta-features. Additionally, the data owner hashes the model and the query to generate randomness to make the output private. The data owners secret share the model output with each other, thereby giving each of the data owner a share from each of the other data owners and the output of the data owner. Each data owner encrypts the shares corresponding to each of the other data owners, the output of the data owner, and sampled local differential privacy noise. Each data owner extracts meta-features from the encrypted model outputs (i.e., the encrypted shares of the other data owners and the output of the data owner) using meta-training samples that are produced from the dataset of the data owner and cluster centroids from the other data owners. Cluster centroids are generated by each data owner by clustering the meta-training samples of the data owner and identifying the cluster centroids of those meta-training samples. The cluster centroids are then secret shared with the other data owners and the meta-training samples are kept secret from other data owners and the service provider.

Using the meta-features from the data owners, the service provider generates a response to the query. In generating the response, the meta-features are evaluated using the meta-model to determine weights to be assigned to outputs on each of the individual data owner models. Thus, the purpose of the meta-model is to derive the importance that the query should place on the query response received from each of the data owners. The meta-model outputs weight vectors that are used by the query to place weights on the predictions or output provided by each local machine learning model within the ensemble. The weightings and which models are selected to be used in generating the response to the query are hidden by adding noise to the weight vectors. The final query response is generated by running an inner-product on the weight vector and the vector of the individual model outputs to hide the output of individual models.

Such a system provides a technical improvement over current systems for providing query responses using a service provider that is connected to multiple data owners. The described system and method provides a technique that enables the data owners to collaborate to provide a response to the query, while ensuring that neither the other data owners or the service provider will learn information about the information sets or models of the data owner. The system provides a method for a private inference using an ensemble of private models and a private meta-model. In other words, the described system allows each data owner to keep their data private from other entities. Additionally, the system enables to the service provider to cryptographically prove the performance of the service even though the service includes different models that are trained from different data distributions. The system is designed so that, unlike conventional systems, the system does not have to include one or more entities that are either semi-trusted or fully trusted.

Additionally, the described system ensures fairness for clients during inferences from an ensemble of models by ensuring the same owner models are being used for all client queries of the same type. Thus, clients using the service can be guaranteed that the service provider cannot use different information sets or models for answering the same type of queries from different clients. In other words, if the service provider commits to a certain set of models or information sets as a part of its service, then every client using the service will have the same types of queries answered using the same set of models that the service provider committed to, thereby ensuring fairness for all the clients. The system enables a technique to ground the ensemble of models used in the query responses and cryptographically verify their use in inferences leading up to a query response. Such proof of performance and guaranteed fairness to clients is not contemplated using conventional systems. Thus, the described system provides a private and fair ensemble learning and inference using machine models or information sets of multiple data owners.

FIG. 1 illustrates a method for using a service provider to provide a response to a query using a plurality of data owners while maintaining privacy among the data owners and between the data owners and the service provider. At 101 the service provider receives a query from a user or client. The service provider is connected with a plurality of data owners, each having at least one dataset that includes information responsive to the query. Additionally, each of the data owners has a local machine learning model that is trained on the dataset of a corresponding data owner. The data owner does not want to reveal information regarding the local machine learning model or underlying dataset to other data owners or the service provider. The group of local machine learning models across the data owners are referred to as an ensemble. The models within the ensembles are independently trained with respect to other models within the ensemble and can, therefore, be different types of models, have different data distributions, and are trained using different data as compared to other models within the ensemble. In other words, the models within the ensemble do not have to have any uniformity between models across the data owners.

Figure 2:
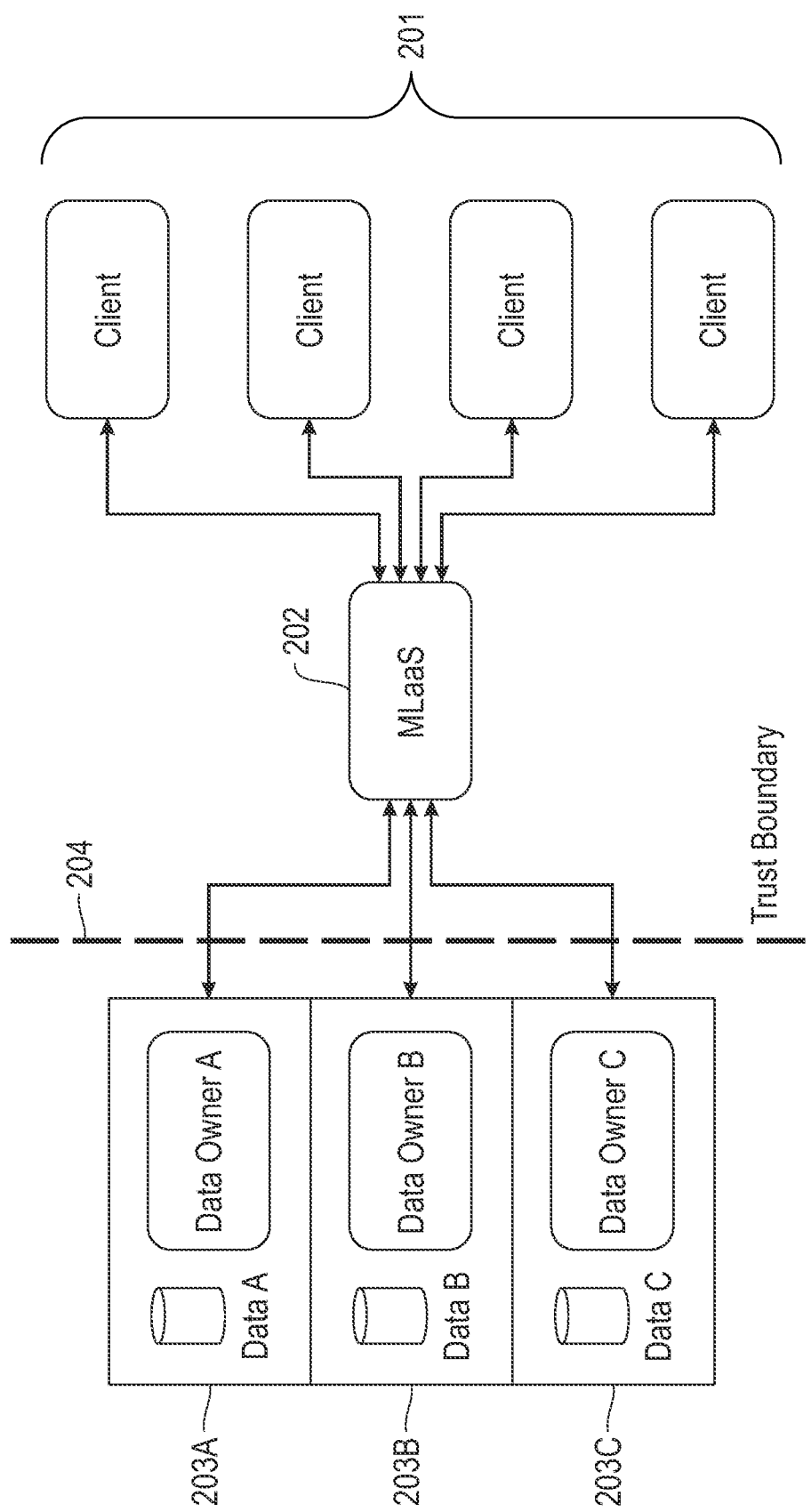
FIG. 2 illustrates an example setting of a service provider that interfaces between multiple data owners and clients.

FIG. 2 provides an illustration of the setting of the described system. Clients 201 can access the service provider 202 to provide a query that can be run on data of data owners 203A, 203B, and 203C. In such a system, a trust boundary 204 exists where the data owners 203A-203C do not trust each other or the service provider. In the described system the service provider 202 is a machine-learning-as-a-service (MLaaS) service provider. In a typical MLaaS system, the service provider uses the information of the data owners to provide predictions to the client that are responsive to the query of the client. The service provider runs a machine-learning model on the query and then provides the predictions that are output by the machine-learning model to the client. The machine-learning model of the service provider is trained using the information sets of the data owners. In the described system the result is similar. However, in order to preserve privacy and fairness, some steps are performed by different entities of the described systems as compared to conventional systems, as described in more detail herein.

Each of the data owners extracts a set of meta-features from the local machine learning model of the data owner that is trained using the dataset of the data owner. In other words, the set of meta-features is computed by a data owner using the data owner's model and dataset. Additionally, the data owners collaborate to extract additional meta-features across the models of all the data owners. These meta-features will be referred to as global meta-features to distinguish from the local meta-features extracted by each data owner individually from their own model and dataset. To extract the global meta-features, the data owners perform a collaboration facilitated by the service provider. The collaboration may include a secure multi-party computation that securely extracts the meta-features from across the models of the data owners. In order to preserve privacy of the data owners, the global meta-features are extracted in an approximate way while also mostly preserving the accuracy of the models. Additionally, the efficiency of the protocol is maintained.

From the meta-features and the global meta-features, the data owners work together, for example, using a multi-party computation algorithm that is encrypted and secure, to train a meta-model. While the local models are complex, the meta-model is a simpler model. For example, the local models may be many layered models, whereas the meta-model may be a one- or two-layer model. After the meta-model training, each data owner has a random share of the meta-model. This ensures that no single party can learn any information regarding the underlying local models or datasets, but allows the data owners to collaborate and use the meta-model shares together in a secure manner to answer a query. Thus, each data owner has a complex local model and a share of the simpler meta-model. The data owners can then work together in a secure collaboration facilitated by the service provider and using the local models and shared meta-model to answer a query provided by a client.

At 102 the service provider provides the query to each of the plurality of data owners. Each of the data owners evaluates the query on the local model of the data owner. This evaluation is performed independently at each data owner. In other words, each data owner evaluates the query using the local machine learning model of the data owner and irrespective of the models of other data owners or evaluation being performed by the other data owners. In performing the evaluation, the data owner and the client run a secure two-party computation protocol. This protocol is facilitated by the service provider who transmits messages between the entities. Using the protocol, the data owner computes the model output for the query using the local model corresponding to the data owner. In order to assist in ensuring privacy and prevent other entities from inferring information regarding the local models and underlying datasets, the data owner hashes the model and the query. The hash is used to generate randomness for subsequent steps where information is shared among different entities of the system.

At 103 the service provider facilitates sharing of model output among the data owners. The sharing may be facilitated using a multi-party computation algorithm in order to ensure security and privacy. Each data owner will share the hashed model output generated by that data owner with all the other data owners. Thus, each data owner will have a hashed model output from each of the other data owners and the model output from their own local model. In sharing the model output, the data owners use a protocol so that the model output is secret shared with the other data owners. The data owners also sample local differential privacy noise using a standard differential privacy (DP) mechanism for private model inference. Each data owner then individually encrypts the model output share of the other data owners along with the sampled differential privacy noise. When encrypting the model output share and noise, the data owner uses a public key that corresponds to the data owner of the share being encrypted. In other words, each model share and noise gets individually encrypted by each data owner using a public key corresponding to the data owner that generated the corresponding share. Each data owner also encrypts their own model output and noise using their own public key.

At 104 the service provider receives a set of meta-features corresponding to the query from each of the plurality of data owners. Thus, the service provider receives a number of sets of meta-features, where the number is equal to the number of local training models used in the ensemble. It should be understood that one data owner may have multiple local training models and would perform the described steps for each local training model. In generating the set of meta-features, the data owners use a set of meta-training samples. The meta-training samples are generated from the underlying dataset. Each data owner clusters its own meta-training samples and identifies cluster centroids from the clusters. A fixed number of the cluster centroids are shared with the other data owners. The number of cluster centroids that will be used is the same number for all data owners. Using its own meta-training samples and the cluster centroids of the other data owners, each data owner runs a meta-feature extraction on the encrypted model outputs and using a multi-party computation to extract the meta-features for the query.

Thus, from the output of the model, the corresponding data owner extracts meta-features from the model. Unlike the training phase, during this phase, the extracted set of meta-features are based upon the query. In other words, since the query is evaluated against the model, the output of the model is based upon the query. Thus, the meta-features that are extracted from this output is also based upon the query. The result is that each data owner has a local model evaluation result and a set of meta-features that are based upon the query. These sets of meta-features from each data owner are then provided to the service provider.

Some examples of meta-features include complex models forward pass and post processing, feature-space neighborhood: K-NN for each sample based on the distribution of features, decision-space neighborhood: K-NN for each sample based on the distribution of output probabilities, different features of a neighborhood (e.g., local accuracy in the feature-space, extent of consensus in the feature-space, overall accuracy in the feature-space, degree of confidence for the input sample, etc.), and the like. Some example mathematical algorithms that can be used in the multi-party computation to extract the meta-features include DNN forward pass: ABY3 or Secure NN, feature-space neighborhood: Euclidean distance protocol and sorting protocol, decision-space neighborhood: sorting protocol, counting mismatch protocol, dot product protocol, no extra cost, and the like. Other meta-features may be extracted and other mathematical algorithms may be used to extract meta-features.

The service provider determines, from the received sets of meta-features, whether a response to the query can be generated at 105. If the response cannot be generated, the system may take no action at 106. Alternatively, the system may provide an indication that no response can be generated. One reason that a response cannot be generated is if none of the data owners have information or enough information that would be responsive to the query. Another reason that a response cannot be generated is if a set of meta-features could not be generated by the data owners.

If, on the other hand, a response can be generated, the service provider may generate a response to the query at 107 using the meta-model. To generate the response, the service provider evaluates the meta-model using the meta-features that were extracted by the data owners and provided to the service provider. The service provider facilitates a multi-party computation for the inference of the meta-model. The meta-features are provided as input to the meta-model. The output of the meta-model are weight vectors that identifying weights to be applied to outputs of the individual models. In other words, the purpose of the meta-model is to derive the importance that the query should place on each of the individual local models. Thus, the meta-model outputs weight vectors that are used by the client query to place weights on the predictions provided as output from each of the models within the ensemble.

To hide the weights that are applied to a local model and which models are selected and not selected in returning a response to the query, the system samples, using a differential privacy mechanism for private counting, a differential privacy noise vector to add to the weight vectors. This noise hides the individual models that are selected. The final output is the result of running an inner-product on the weight vector and the vector of the individual model outputs. That result is added to the product of the weight vector and the noise that was added to hide the output of the individual models. Stated differently, the final output may be calculated by an inner-product on <weight vector, vector of model outputs>+<weight vector, $p_1$>; where $p_1$ is the noise used to hide the output of the individual models. This two-layered-differential-privacy approach protects both the identity of the models chosen from the ensemble (differential privacy for private counting) and the information about the training data from the model's prediction (differential privacy for model inference). The service provider then provides the result to the client providing the query, where the result is the outputs from the selected models and the weights so that the query knows what importance to place onto the outputs.

The described system also provides a technique for benchmarking the performance of the service provider. In other words, the described system provides a technique that allows a user to determine if the service provider is fulfilling the performance guaranteed by the service provider. Thus, the described system provides provable performance by the service provider. To benchmark the performance, the system creates a zero-knowledge proof to prove the ensemble of models and the meta-model has the performance claimed by the service provider using hashes stored in a hash commitment directory. The performance proof is created from a public benchmarking dataset. The data owners perform a similar process as described above with respect to a query received from a client. However, in this case the benchmarking dataset is treated like the query.

To generate the proof, each of the data owners creates a vector of outputs for each sample in the benchmarking dataset and also generates a commitment on the vector of outputs, for example a Pedersen vector commitment. These commitments are stored in the hash commitment directory. The data owners each locally compute the meta-features on the meta-training dataset generated from the benchmarking data and also computes its share for the data that has samples from all data owners, similar to that discussed before. Commitments are generated on all the meta-features and, for the meta-features that involve all data owners, a multi-prover zero-knowledge proof is generated for the correct computation of that part using the commitments of the inputs. The meta-model is privately evaluated and commitments are generated on its output, which are the weight vectors. Additionally, a multi-prover zero-knowledge proof is generated for the meta-model's correct evaluation. A multi-prover version of the zero-knowledge inner product argument is then run to obtain a proof of the benchmarking result starting from the vector commitments of the model evaluation and the weight vector. With the zero knowledge proofs, the system provides a fairness guarantee ensuring that all client queries of the same type are answered using the same ensemble of models.

Figure 3:
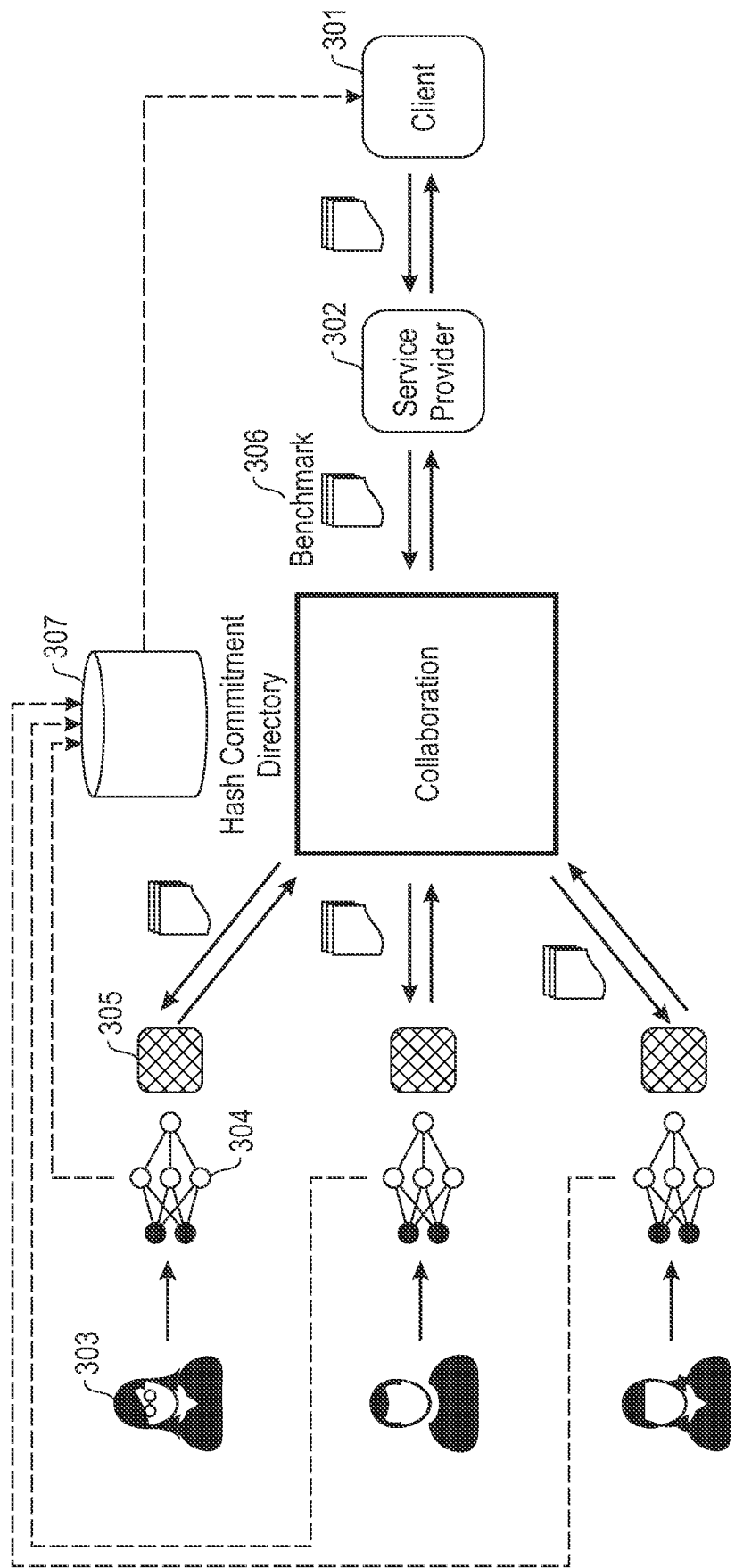
FIG. 3 illustrates an example overall system architecture for using a service provider to provide a response to a query using a plurality of data owners while maintaining privacy among the data owners and between the data owners and the service provider.

FIG. 3 illustrates an example system architecture for using a service provider to provide a response to a query using a plurality of data owners while maintaining privacy among the data owners and between the data owners and the service provider. A client 301 provides a query to a service provider who is in communication with multiple data owners 303. Each data owner 303 has a local machine learning model 304 and a portion of a meta-model 305. The service provider 302 facilitates a collaboration, using secure multi-party computation, between the data owners 303 to generate a response to the query provided by the client 301. This collaboration ensures that information of a data owner is not revealed to other data owners or the service provider. Additionally, the data owners 303 can work together to generate a proof that the service provider 302 is performing as promised. This proof is generated using a hash commitment director 307 and benchmarking data 306. The result is a system that ensures privacy of data owner information while ensuring accuracy of responses to queries and performance of the service provider.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
receiving, at a service provider, a query from a user, wherein the service provider is connected with a plurality of data owners, each of the plurality of data owners having at least one dataset comprising information responsive to the query, wherein each of the plurality of data owners do not trust other of the plurality of data owners and the service provider;
providing, by the service provider, the query to each of the plurality of data owners, wherein each of the plurality of data owners has a local machine learning model trained using a dataset of a corresponding data owner, wherein each data owner evaluates the query by running a secure two-party computation protocol with the user facilitated by the service provider transmitting messages between the user and a corresponding of the plurality of data owners and wherein each data owner provides a commitment of the local machine learning model that is stored in a hash commitment directory for benchmarking, and wherein the plurality of data owners train a meta-model by a collaboration facilitated by the service provider using secure multi-party computation, wherein each of the plurality of data owners has a share of the meta-model;
secret sharing, via the service provider and using a multi-party computation algorithm to ensure security and privacy, model output from each of the plurality of data owners between the other of the plurality of data owners, wherein the model output comprises an output responsive to the query computed using the local machine learning model corresponding to the data owner and wherein the sharing comprises, each of the plurality of data owners, encrypting, to each other data owner, the model output corresponding to the data owner and encrypting the model output shared from the other of the plurality of data owners;
receiving, at the service provider and from each of the plurality of data owners, a set of local meta-features corresponding to the query and comprising forward pass processing of the local machine learning model of a given of the plurality of data owners, post processing of the local machine learning model of the given of the plurality of data owners, and at least one neighborhood of the local machine learning model of the given of the plurality of data owners, wherein each of the set of the local meta-features are extracted, from the encrypted secret shares of the model outputs, by a corresponding of the plurality of data owners using meta-training samples from the local machine learning model and cluster centroids from other of the plurality of data owners; and
generating, using the service provider, a response to the query, wherein the generating comprises determining, by evaluating the meta-model using the set of local meta-features received from each of the plurality of data owners, weights for outputs from the local machine learning models and aggregating the outputs in view of the weights.

2. The method of claim 1, wherein each of the plurality of data owners extracts, from the local machine learning model corresponding to the data owner, the set of local meta-features.

3. The method of claim 2, wherein the collaboration comprises the plurality of data owners extracting, by running a multi-party computation, global meta-features across the local machine learning models of the plurality of data owners; and
wherein the meta-model is trained using the set of local meta-features from each of the local machine learning models and the global meta-features using secure multi-party computation.

4. The method of claim 1, wherein the sharing comprises each of the plurality of data owners sampling differential privacy noise based upon agreed upon system privacy parameters corresponding to a given of the plurality of data owners and encrypting the differential privacy noise.

5. The method of claim 1, wherein the generating comprises adding noise to the model outputs and the weights for the model outputs.

6. The method of claim 1, wherein each of the plurality of data owners generates the cluster centroids of a corresponding data owner by clustering the meta-training samples of the corresponding local machine learning model and identifying cluster centroids from each meta-training sample cluster.

7. The method of claim 1, comprising generating a performance proof for benchmarking the performance of the service provider, wherein the query comprises a benchmarking dataset, wherein each of the plurality of data owners produces a vector of outputs for each sample within the benchmarking dataset and a commitment on the vector of outputs, and wherein the set of meta-features comprises a commitment generated for the set of local meta-features.

8. The method of claim 1, wherein each of the local machine learning models are independently trained from and have different data distributions with respect to other of the local machine learning models.

9. The method of claim 1, wherein the generating comprises ensuring fairness for users providing queries by ensuring the plurality of data owners selected for one of the queries are the same plurality of data owners selected for another of the queries of the same type by cryptographically verifying use of the local machine learning models of the plurality of data owners.

10. An apparatus, comprising:
at least one processor; and
a computer readable storage medium having computer readable program code embodied therewith and executable by the at least one processor;
wherein the computer readable program code is configured to receive, at a service provider, a query from a user, wherein the service provider is connected with a plurality of data owners, each of the plurality of data owners having at least one dataset comprising information responsive to the query, wherein each of the plurality of data owners do not trust other of the plurality of data owners and the service provider;
wherein the computer readable program code is configured to provide, by the service provider, the query to each of the plurality of data owners, wherein each of the plurality of data owners has a local machine learning model trained using a dataset of a corresponding data owner, wherein each data owner evaluates the query by running a secure two-party computation protocol with the user facilitated by the service provider transmitting messages between the user and a corresponding of the plurality of data owners and wherein each data owner provides a commitment of the local machine learning model that is stored in a hash commitment directory for benchmarking, and wherein the plurality of data owners train a meta-model by a collaboration facilitated by the service provider using secure multi-party computation, wherein each of the plurality of data owners has a share of the meta-model;
wherein the computer readable program code is configured to secret share, via the service provider and using a multi-party computation algorithm to ensure security and privacy, model output from each of the plurality of data owners between the other of the plurality of data owners, wherein the model output comprises an output responsive to the query computed using the local machine learning model corresponding to the data owner and wherein the sharing comprises, each of the plurality of data owners, encrypting, to each other data owner, the model output corresponding to the data owner and encrypting the model output shared from the other of the plurality of data owners;
wherein the computer readable program code is configured to receive, at the service provider and from each of the plurality of data owners, a set of local meta-features corresponding to the query and comprising forward pass processing of the local machine learning model of a given of the plurality of data owners, post processing of the local machine learning model of the given of the plurality of data owners, and at least one neighborhood of the local machine learning model of the given of the plurality of data owners, wherein each of the set of the local meta-features are extracted, from the encrypted secret shares of the model outputs, by a corresponding of the plurality of data owners using meta-training samples from the local machine learning model and cluster centroids from other of the plurality of data owners; and
generate, using the service provider, a response to the query, wherein the generating comprises determining, by evaluating the meta-model using the set of local meta-features received from each of the plurality of data owners, weights for outputs from the local machine learning models and aggregating the outputs in view of the weights.

11. A computer program product, comprising:
a computer readable storage medium having computer readable program code embodied therewith, the computer readable program code executable by a processor;
wherein the computer readable program code is configured to receive, at a service provider, a query from a user, wherein the service provider is connected with a plurality of data owners, each of the plurality of data owners having at least one dataset comprising information responsive to the query, wherein each of the plurality of data owners do not trust other of the plurality of data owners and the service provider;
wherein the computer readable program code is configured to provide, by the service provider, the query to each of the plurality of data owners, wherein each of the plurality of data owners has a local machine learning model trained using a dataset of a corresponding data owner, wherein each data owner evaluates the query by running a secure two-party computation protocol with the user facilitated by the service provider transmitting messages between the user and a corresponding of the plurality of data owners and wherein each data owner provides a commitment of the local machine learning model that is stored in a hash commitment directory for benchmarking, and wherein the plurality of data owners train a meta-model by a collaboration facilitated by the service provider using secure multi-party computation, wherein each of the plurality of data owners has a share of the meta-model;
wherein the computer readable program code is configured to secret share, via the service provider and using a multi-party computation algorithm to ensure security and privacy, model output from each of the plurality of data owners between the other of the plurality of data owners, wherein the model output comprises an output responsive to the query computed using the local machine learning model corresponding to the data owner and wherein the sharing comprises, each of the plurality of data owners, encrypting, to each other data owner, the model output corresponding to the data owner and encrypting the model output shared from the other of the plurality of data owners;

wherein the computer readable program code is configured to receive, at the service provider and from each of the plurality of data owners, a set of local meta-features corresponding to the query and comprising forward pass processing of the local machine learning model of a given of the plurality of data owners, post processing of the local machine learning model of the given of the plurality of data owners, and at least one neighborhood of the local machine learning model of the given of the plurality of data owners, wherein each of the set of the local meta-features are extracted, from the encrypted secret shares of the model outputs, by a corresponding of the plurality of data owners using meta-training samples from the local machine learning model and cluster centroids from other of the plurality of data owners; and generate, using the service provider, a response to the query, wherein the generating comprises determining, by evaluating the meta-model using the set of local meta-features received from each of the plurality of data owners, weights for outputs from the local machine learning models and aggregating the outputs in view of the weights.

12. The computer program product of claim 11, wherein each of the plurality of data owners extracts, from the local machine learning model corresponding to the data owner, the set of local meta-features.

13. The computer program product of claim 12, wherein the collaboration comprises the plurality of data owners extracting, by running a multi-party computation, global meta-features across the local machine learning models of the plurality of data owners; and wherein the meta-model is trained using the set of local meta-features from each of the local machine learning models and the global meta-features using secure multi-party computation.

14. The computer program product of claim 11, wherein the sharing comprises each of the plurality of data owners sampling differential privacy noise based upon agreed upon system privacy parameters corresponding to a given of the plurality of data owners and encrypting the differential privacy noise.

15. The computer program product of claim 11, wherein the generating comprises adding noise to the model outputs and the weights for the model outputs.

16. The computer program product of claim 11, wherein each of the plurality of data owners generates the cluster centroids of a corresponding data owner by clustering the meta-training samples of the corresponding local machine learning model and identifying cluster centroids from each meta-training sample cluster.

17. The computer program product of claim 11, comprising generating a performance proof for benchmarking the performance of the service provider, wherein the query comprises a benchmarking dataset, wherein each of the plurality of data owners produces a vector of outputs for each sample within the benchmarking dataset and a commitment on the vector of outputs, and wherein the set of meta-features comprises a commitment generated for the set of local meta-features.

18. The computer program product of claim 11, wherein each of the local machine learning models are independently trained from and have different data distributions with respect to other of the local machine learning models.

\* \* \* \* \*